Feb. 12, 1935. F. L. WALDRON ET AL 1,991,267
BEAN POD CUTTER
Filed Oct. 20, 1932
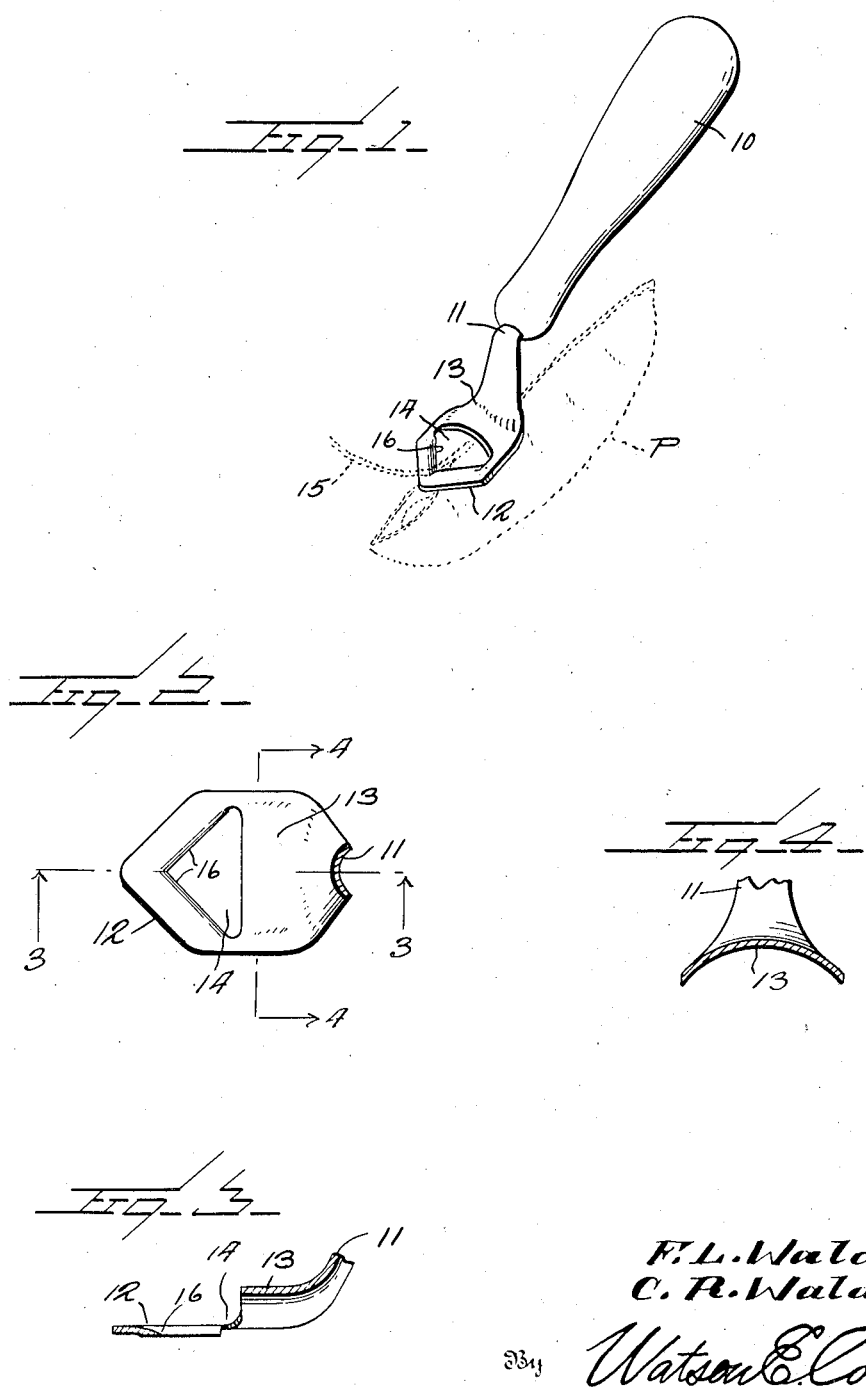

Patented Feb. 12, 1935

1,991,267

UNITED STATES PATENT OFFICE 1,991,267

BEAN POD CUTTER

Floyd L. Waldron and Charles R. Waldron, Huron, Ohio

Application October 20, 1932, Serial No. 638,819

3 Claims. (Cl. 146—203)

This invention relates to kitchen tools or implements, and more particularly to a tool to facilitate the removal of beans from pods.

An object of this invention is to provide a pod cutting tool which is exceedingly simple in construction and which embodies features to permit the cutting of one edge of a bean pod so that the pod can be readily opened and the beans removed therefrom.

Another object of this invention is to provide in a tool of this kind, means whereby the cutting portion of the tool will be maintained centrally of the pod so that it will be in cutting position at all times when engaged with the pod.

A further object of this invention is to provide in a tool of this kind, means whereby it may be readily sharpened with any desired sharpening tools or material.

The above and various other objects and advantages of this invention will in part be described and in part be understood from the following detailed description of the present preferred embodiment, the same being illustrated in the accompanying drawing wherein:—

Figure 1 is a detail perspective view of a device constructed according to the preferred embodiment of this invention.

Figure 2 is a fragmentary plan view of the tool.

Figure 3 is a longitudinal section taken on the line 3—3 of Figure 2.

Figure 4 is a transverse section taken on the line 4—4 of Figure 2.

Referring to the drawing wherein like characters of reference designate corresponding parts throughout the several views, the letter P designates generally a bean pod which, in the present instance, is a lima bean pod.

In order to facilitate the opening of the pod P, we have provided a tool comprising a handle 10 which has attached thereto a shank 11. A V-shaped cutter, generally designated as 12, is secured to the shank 11 by means of an intermediate guiding portion 13, which is disposed on an angle to the shank 11 and the cutter 12, and this guiding portion 13 is arcuate in transverse section so that as the tool is moved along one edge of the pod P, the edge of the pod will be maintained in substantially the center of the guiding member 13.

By offsetting the cutter 12 from the shank 11, the tool may be pulled or drawn along the edge of the pod P with the handle substantially parallel with the adjacent edge of the pod P. By providing a V-shaped cutter 12, as disclosed in the drawing, a central opening 14 is provided through which the rib 15 of the pod is adapted to extend during the cutting thereof of this rib 15 off of the pod P.

Preferably, the upper surface of the cutter 12 is inclined, as at 16, so that the rib 15 will be forced upwardly and away from the severed edge of the pod P. By providing a V-shaped cutter 12, the apex of the cutter will have a tendency to center itself over the rib 15 during the movement of the cutter over the edge of the pod, thereby eliminating the necessity of holding the handle 10 in a position to maintain the cutter 12 in desired position relative to the pod P.

This position is also facilitated by means of the curvature of the guiding member 13, and as the cutter 12 is downwardly offset from the guiding member 13 a desired distance, a sufficient amount of material is cut off of the edge of the pod P so that the pod can be readily opened to remove the beans therefrom.

The device herein disclosed is exceedingly simple in construction and embodies the use of material which can be very cheaply manufactured so that the cost of manufacture will permit the sale of the device at a very reasonable price.

In the use of this tool, the pod P may be grasped in one hand with the edge of the pod having the string uppermost whereupon the guiding member 13 can be positioned at one end of the pod with the cutter 12 disposed slightly below the adjacent edge of the pod. The cutter 12 can then be moved along the edge of the pod and the rib or string 15 will be cut from the pod and will pass upwardly and outwardly through the opening 14.

It will be obvious, from the foregoing, that the operation of removing the beans from the pods has been simplified so that one person can remove an exceedingly large number of beans from pods in a relatively short time.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A tool comprising a handle, a shank secured to the handle, a guide means integral with the shank, said guide means extending laterally of the shank and being arcuate in transverse section with the concave side lowermost, and a V-shaped cutter integral with the guide means and downwardly and forwardly offset therefrom, said cutter being positioned with the divergent ends of the cutter confronting the forward end of the guide means whereby to provide an opening between the cutter and the guide means to permit the material cut from an article to pass upwardly therethrough and the keen edged portions of the cutter being substantially coplanar with the lower edges of the guide means.

2. A tool comprising a handle and a cutting member secured to the handle, said member comprising a sheet of metal having a body portion and a reduced portion integral therewith and constituting a shank for engagement with the handle, said body having a triangular cut out portion, two adjacent sides of the triangle having keen edges and the other side being upwardly offset and constituting a guide means and being arcuate in transverse section with the concave side lowermost.

3. A tool comprising a handle and a cutting member secured thereto, said member comprising two forwardly convergent cutting blades, a guide integral with the divergent ends of the blades and having the central portion thereof upwardly offset, said central portion being arcuate in transverse section with the concave side lowermost and a shank integral with the guide.

FLOYD L. WALDRON.
CHARLES R. WALDRON.